(12) United States Patent
Leenstra et al.

(10) Patent No.: US 6,829,699 B2
(45) Date of Patent: Dec. 7, 2004

(54) RENAME FINISH CONFLICT DETECTION AND RECOVERY

(75) Inventors: Jens Leenstra, Bondorf (DE); Dieter Wendel, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 438 days.

(21) Appl. No.: 09/683,391

(22) Filed: Dec. 20, 2001

(65) Prior Publication Data

US 2002/0083304 A1 Jun. 27, 2002

(51) Int. Cl.$^7$ ................................................. G06F 9/38
(52) U.S. Cl. ........................... 712/216; 712/23; 712/217
(58) Field of Search ........................... 712/23, 216, 217

(56) References Cited

U.S. PATENT DOCUMENTS

| 5,546,597 | A | * | 8/1996 | Martell et al. | 712/23 |
| 5,625,789 | A | * | 4/1997 | Hesson et al. | 712/217 |
| 6,122,727 | A | * | 9/2000 | Witt | 712/214 |

* cited by examiner

Primary Examiner—Kenneth S. Kim
(74) Attorney, Agent, or Firm—Scully, Scott, Murphy & Presser; Derek S. Jennings (57) ABSTRACT

An improved method and system for operating an out of order processor at a high frequency enabled by an increased pipeline length. It is proposed to shorten the pipeline by a considerable number of stages by accepting that a write after read conflict may occur, when directly after renaming, during the "read ROB" pipeline stage, all the information (tag, validity and data) is read from an Reorder Buffer ROB entry, and is next written, in a following pipeline stage "write RS", into a reservation station (RS) entry. In order to assure the correctness of processing in particular in cases of dependencies, e.g., write after read conflicts a separate inventional add in logic covers these cases. The logic detects the write after read conflict case of an Instructional Execution Unit (IEU) writing into the particular entry that is selected by the renaming logic during "read ROB". Then, a separate issue process selects the entries for which a conflict is reported and writes the data into the respective entry of the RS. This increases performance because those conflict cases are rather seldom compared to the broad majority of instructions to be found in a statistically determined average instruction flow.

9 Claims, 11 Drawing Sheets

RENAME FINISH CONFLICT DETECTION AND RECOVERY

CROSS-RELATED APPLICATIONS

This application is related to U.S. patent application Ser. No. 09/683,351 entitled "Method For Handling 32 Bit Results For An Out Of Order Processor With A 64 Bit Architecture", filed Dec. 18, 2001, and U.S. patent application Ser. No. 09/683,383 entitled "Method and System for Pipeline Reduction", filed Dec. 20, 2001. The subject matter of these applications are incorporated herein by reference.

BACKGROUND OF INVENTION

1. Field of the Invention

The present invention relates to improvements of out of order CPU architectures regarding performance purposes. In particular it relates to an improved method and system for operating a high frequency out of order processor with increased pipeline length.

2. Description Disadvantages of Prior Art

The present invention has a quite general scope which is not limited to a vendor specific processor architecture because its key concepts are independent therefrom.

Despite of this fact it will be discussed with a specific prior art processor architecture.

Said prior art out of order processor in this example an IBM S/390 processor has as an essential component a so called Instruction Window Buffer, further referred to herein as IWB, too. After coming from an instruction cache and passed through a decode and branch prediction unit the instructions are dispatched still in order. In this out of order processor the instructions are allowed to be executed and the results written back into the IWB out of order.

In other words, after the instructions have been fetched by a fetch unit stored in the instruction queue and have been renamed in a renaming unit they are stored in order into a part of the IWB called reservation station. From the reservation station the instructions may be issued out of order to a plurality of instruction execution units abbreviated herein as IEU, and the speculative results are stored in a temporary register buffer, called reorder buffer, abbreviated herein as ROB. These speculative results are committed (or retired) in the actual program order thereby transforming the speculative result into the architectural state within a register file, a so called Architected Register Array, further abbreviated herein as ARA. In this way it is assured that the out of order processor with respect to its architectural state behaves like an in order processor.

Within the above summarized scheme, "Renaming" is the process of allocating a new register in the reorder buffer for every new speculative execution result. Renaming is done to avoid the so called "write after read" and "write after write" hazards that otherwise would prevent the out of order execution of the instructions. Each time a new register is allocated, a destination tag the instruction ID is associated with this register. With the help of this tag the speculative result of the execution is written in the newly allocated register. Later on, the in order completion process sets the architectural state by writing the speculative data into a architectural register or by setting a flag bit that specifies that the data has become part of the architectural state. In this way, the out of order processor behaves from an architectural point of view as if it executes all instructions in an in order sequence.

Figure 1:
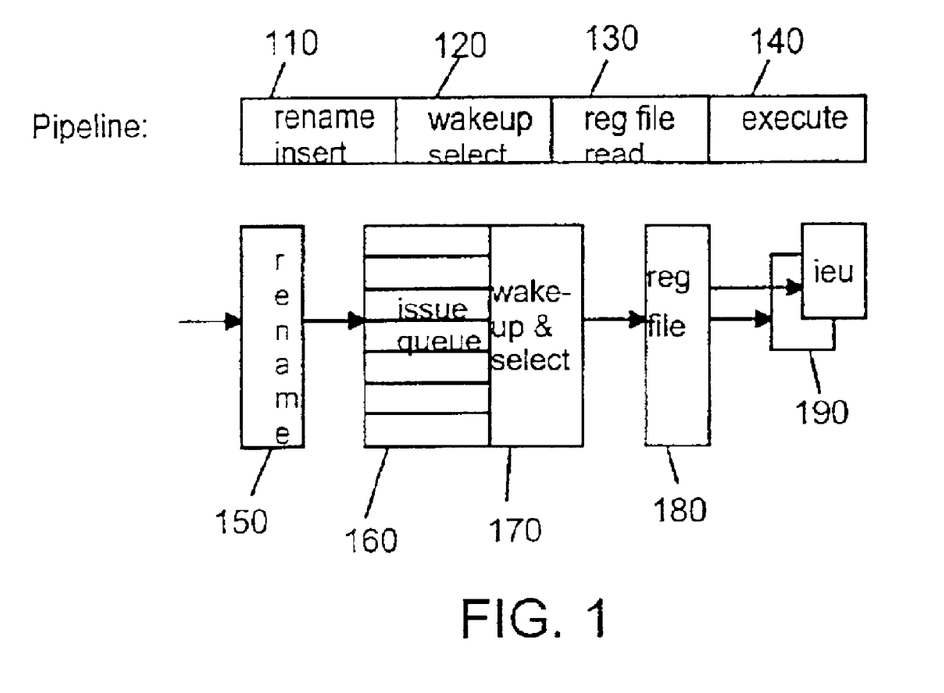
FIG. 1 is a schematic diagram showing essentials of a prior art renaming pipeline without storage of source data in the issue queue.
Figure 2:
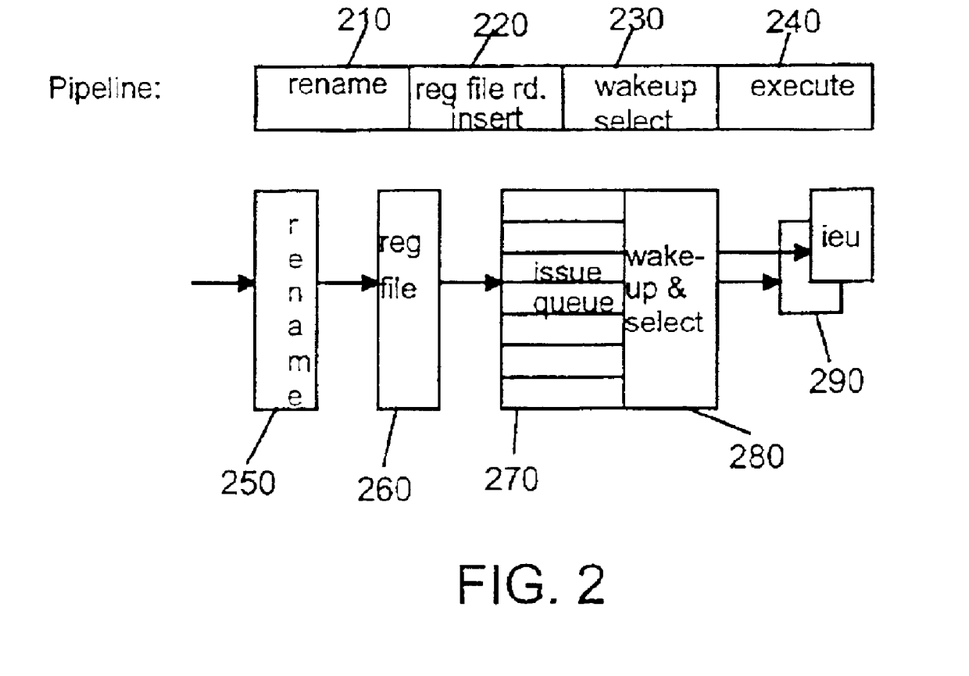
FIG. 2 is a schematic diagram showing essentials of a prior art renaming pipeline with storage data in the issue queue.

In a state of the art approach renaming is done according to the schemes shown in FIG. 1 and FIG. 2. In the upper portion of the figures the pipeline stages are illustrated whereas in the respective bottom part a structural overview is given. The main difference between the two schemes is the storing of source data or not storing of source data, respectively, into the issue queue. Therefore, the cycle in which the source data is read from the register file is different.

In particular, the first approach is illustrated in FIG. 1. During renaming 110 the logical register addresses are assigned with physical register addresses in which the source data for the instruction resides. Further, a new register is allocated in which the speculative result of the instruction will be stored after execution. Next, 110, the instruction is written into the issue queue 160, together with all its control bits (like opcode), source validity (if the source data is already available in the register file) and other bits as resulting from the renaming process. The wake up logic 170 of the issue queue will monitor the results produced by the execution units and will set the source that is dependent on the target result to valid for those instructions that are waiting in the issue queue for the specific result in stage 120. The select logic 170 will select commonly in an "oldest first" manner those instructions that will be issued to the execution units when all source data is available (i.e. source valid bits are ON). Once the select logic has selected the instruction that will be issued, the source address will be sent in the next cycle to the register file and the source data will be read from there, 130. Finally, in the last cycle as shown in FIG. 1 the execution 140 of the instruction is performed in an execution unit 190 thereby calculating the speculative result.

In FIG. 2 the alternative pipeline scheme is shown. The difference is that in this case the data is read from the register file 260 directly after renaming 210, 250 in case the source data is available. In stage 220, the instruction is inserted, into the issue queue 270, together with its source data read from the register file. It should be noted that the wake up logic 280 is required to firstly, set the valid bit of the source data and secondly, take care that the speculative results produced by the execution units 290 are written into the source data fields of the specific instruction that uses the speculative result as an input.

Both pipeline models are currently in use. The MIPS R10000, HP PA 8000 and the DEC 21264 are examples of processors that use the model shown in FIG. 1. On the other hand, Intel Pentium, Power PC 604 and HAL SPARC64 are based on the model shown in FIG. 2.

With the increasing number of circuits that fit onto a chip, processor designers enhance the performance of a processor by expanding the number of queue entries, by providing more execution units and especially, by designing the processor for a much higher frequency. Thereby, the trend in industry is especially towards very high frequency designs.

Figure 3:
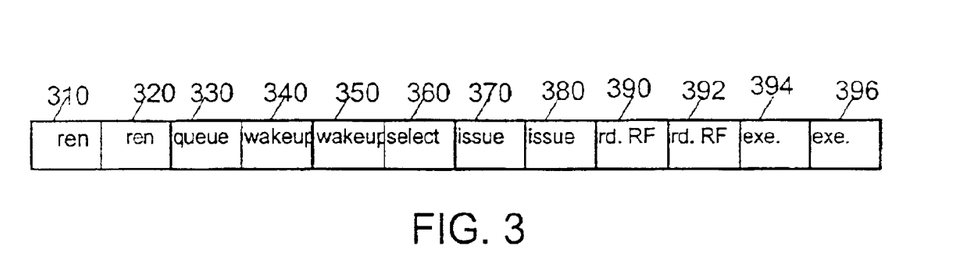
FIG. 3 is a schematic diagram showing essentials of a prior art high frequency pipeline.

For processors with such a very high frequency target, the pipeline schemes shown in FIGS. 1 and 2 are no longer applicable since the logic delay between the pipeline registers becomes too large to support the requested high frequency of operation. To support a much higher frequency the pipeline depth has to increase. For example, the pipeline shown in FIG. 3 has been published in an article entitled "Intel Willamette Processor", C"t Magazin, Vol 5, 2000, pp 16–17. The total pipeline has 20 stages, what is double the number of pipeline stages of its predecessor, the "Intel P6 processor (Pentium III).

The introduction of a much deeper pipeline has the advantage that the processor can run on a much higher frequency and therefore support a much higher throughput of the instructions. The drawback is, however, that the number of cycles needed for each Instruction to go through the pipeline also increases. Since the performance of the processor "MIPS (Millions Instruction per Second)" is equal to frequency divided by cycles per instructions (CPI) the performance gain by introducing a very deep pipeline remains limited.

Therefore, techniques that can reduce the pipeline length in performance critical cases are of great importance to increase the overall processor performance.

Figure 4:
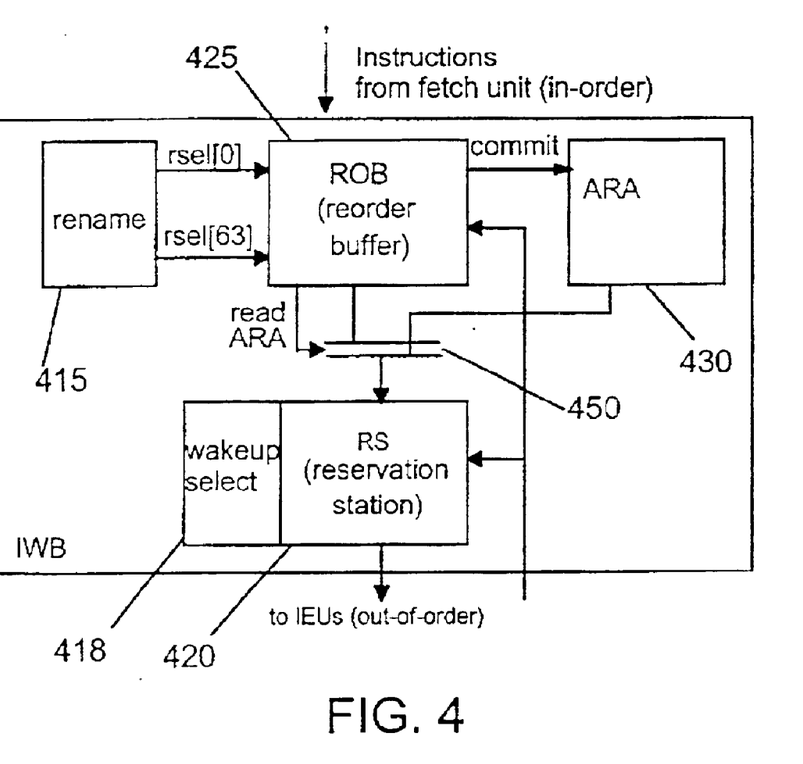
FIG. 4 is a schematic diagram showing essentials of a prior art Instruction Window Buffer (IWB).

With reference to FIG. 4 the IWB macros are shown schematically. In this processor, the so called Instruction Window Buffer (IWB) comprises a renaming logic 415, an issue queue referred herein as reservation station (RS) 418, 420 and amongst others a register buffer 425 referred to herein as ReOrder Buffer (ROB) for holding the speculative results. The architectural results are stored in a Register File 430 called Architectural Register Array (ARA). The reservation station, the ARA and the ROB are connected with a multiplexer unit 450.

Figure 5:
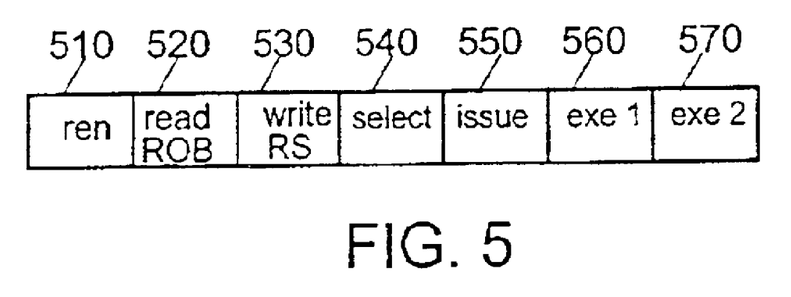
FIG. 5 is a schematic diagram showing essentials of a prior art renaming pipeline applied in FIG. 4.

In FIG. 5 the respective pipeline scheme is shown. The IWB implementation scheme uses the basic pipeline scheme of FIG. 2 where the data is stored in the queue. It is, however, like the processor in ref 1 designed for a much higher frequency. Therefore, the pipeline shown in FIG. 5 has additional cycles in comparison to FIG. 2 to support this frequency target.

The more detailed operation of the FIG. 5 IWB pipeline will now be explained with reference to FIG. 4.

The fetch unit dispatches up to 4 instructions each cycle to the IWB in program order. The IWB pipeline starts with renaming 510 the up to 4 dispatched instructions. The fetch unit dispatches in program order up to 4 instructions each cycle to the IWB. The IWB pipeline starts with renaming, 510, the up to 4 dispatched instructions.

In the next cycle 520, called "read ROB" a plurality of signals RSEL (0 . . . 63) addresses the ReOrder Buffer. The ReOrder Buffer comprises: a tag specifying the reorder buffer entry directly or some other unique id, a valid bit, and the speculative result data. Furthermore, some other information may be stored in the ROB, like exception bits.

When the renaming logic has found a dependency for the source operand then the tag, valid bit and data is read from the ROB. In the write RS cycle 530, this information is stored in the Reservation Station (RS). When no dependency was found the data will be read from the ARA during the "read ROB" cycle 520 and the data together with valid bit set to ON is written for the source operand into the RS.

In the "select" cycle 540, the instruction will be selected for issue when it is the oldest instruction that waits for issue and all the source operand data is available. Then during the issue cycle 550 the data is read out from the RS and finally in the EXE1 cycle 560 and EXE2 cycle 570 the execution of the instructions is done.

Figure 6:
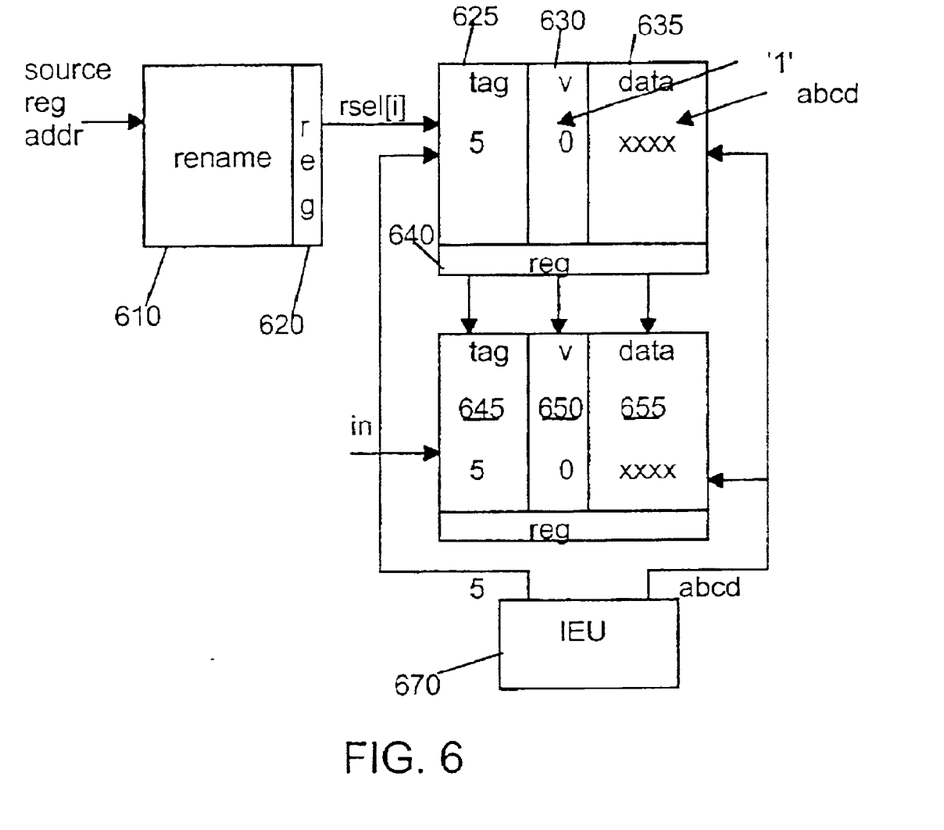
FIG. 6 is a schematic IWB section diagram illustrating the problem of concurrent IEU write and read ROB on the same ROB entry.

With reference now to FIG. 6 the renaming steps and the write after read conflict that can occur when all information that has to be written into the RS is read from a ROB entry. Furthermore, the possibility and disadvantages with respect to circumventing this write after read conflict by using longer pipelines will be discussed next below.

In FIG. 4, renaming, i.e., "read dependent data from the ReOrder Buffer (ROB) 425 and the "write into the Reservation Station (RS) 420" is shown for a single source operand. It should be noted that each instruction may have several operands for which each renaming, read ROB and write RS is done in parallel. For the example given in here (see FIG. 6), the source operand is found dependent on the result of a previous instruction in the ROB to which the exemplary tag 5, see reference sign 625, is assigned.

Therefore, this entry is selected by the renaming logic read select output (RSEL) see back to FIG. 4 for read in the next cycle. After the tag 625, valid bit 630 and data 635 has been read out from the ROB. This data is present at the ROB output registers 640 at the end of the cycle. In the next "write RS" cycle this data is written into the source operand fields 645, 650 and 655, respectively, allocated in the RS 420 (see back to FIG. 4.) for the new instruction.

The problem that occurs is, however, that it takes a "read ROB" 520 and "write RS" cycle 530 before the tag can be used by the RS IEU tag compare logic. If the IEU writes data denoted symbolically as "abcd" in FIG. 6 into the ROB 425 entry that is just read out in the "read ROB" cycle, then the tag will not be present in the RS 420 yet. Hence the result data from the IEU will be stored in the ROB entry, but not in the RS operand field resulting in a write after read conflict. Therefore, in FIG. 6 the ROB entry with tag=5 will be written with "abcd" and the valid bit is turned ON, but the corresponding RS operand field remains "xxxx" and the valid bit remains OFF. Hence, a data inconsistency exists due to the so called write after read conflict between ROB 425 and RS 420 which usually leads to deadlock situations which needs to be avoided.

In processors with a traditional pipeline see FIG. 1 and FIG. 2, this problem is handled in several ways: The first prior art solution is that, the cycle time permits to write the tag during the renaming stage into the RS. Thereafter the validity bit and data is read from the ROB in the next cycle. The problem now no longer exists since the tag is already present in the RS and a match with the IEU tag will prioritize the write of data from the IEU instead of the data read from the ROB.

The second prior art solution is that, the IEU writes the data and sets the valid bit for the ROB entry before the read of the ROB starts. In other words, basically a write through cell is used or the clock cycle is partitioned into phase 1 and phase 2. During phase 1 the write is done and during phase 2 the read ROB/Write RS is done. So again, the longer cycle is exploited.

The third prior art solution is that bus snooping is done during "read ROB/RS write" called "read RF/insert" in FIG. 1 and FIG. 2. Here some additional logic compares the read out ROB tag with the IEU tags and in case of a hit the IEU data will be selected instead of the data read from the ROB. So the cycle time permits to do this snooping.

All these three solutions are used in current processors operating on a lower frequency as targeted in the present invention to keep the data in the ROB consistent with the data in the RS. For any high frequency design the problem of keeping the ROB data consistent with the RS data of the dependent operands needs to be revised.

Furthermore, the Instruction Execution Unit (IEU) protocol often having a delay between the result tag being available and the result data being available complicates the problem of keeping the ROB and RS consistent.

Figure 7:
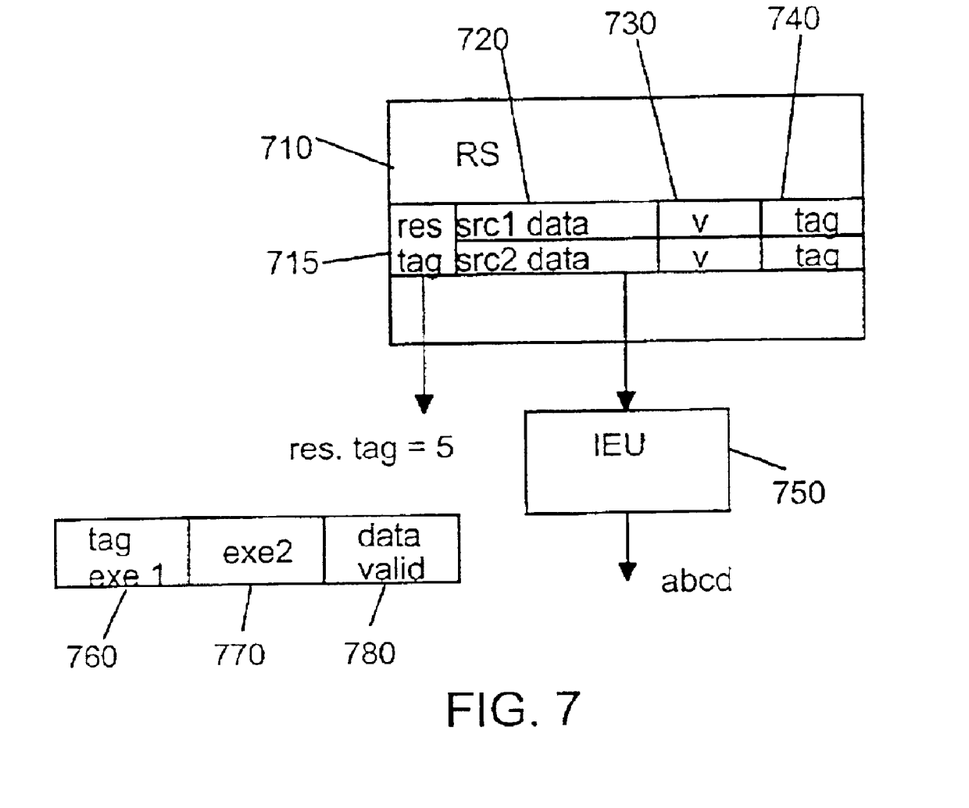
FIG. 7 is a schematic IWB and pipeline section diagram illustrating the problem of the 2 cycle delay between tag and data availability.

With reference to FIG. 7 the reason why the tag and data are available in different cycles is illustrated next below.

When an instruction is issued from the RS, then the result tag 715 "res tag" is read out together with the data 720 of the sources registers "src1 data" and "src2 data". Furthermore, some other bits are read from the RS like the opcode bits that are not shown explicitly in FIG. 7. Hence, the result tag 740 is already available when the execution starts. The result data 780 is available after execution. In the case of a prior art IBM S/390 processor the execution takes 2 cycles leading to the two cycles delay between "tag valid" and "data valid" as shown in FIG. 7. The valid bit 730 is set to ON when the associated src1 data (resp. Src2 data) 720 has become available and it corresponds to reference sign 630 see back to FIG. 6. The tag field 740 in FIG. 7 corresponds to the tag field 625 of FIG. 6. In pipeline stage 760 the result tag is directly valid, since it is directly supplied by the RS and the first part of the execution of the instruction is done by "exe 1". Next, the second part of the instruction execution is done in stage 770 by the "exe 2" stage producing the result data at the end of the cycle. This result data is next valid during stage 780.

Figure 8:
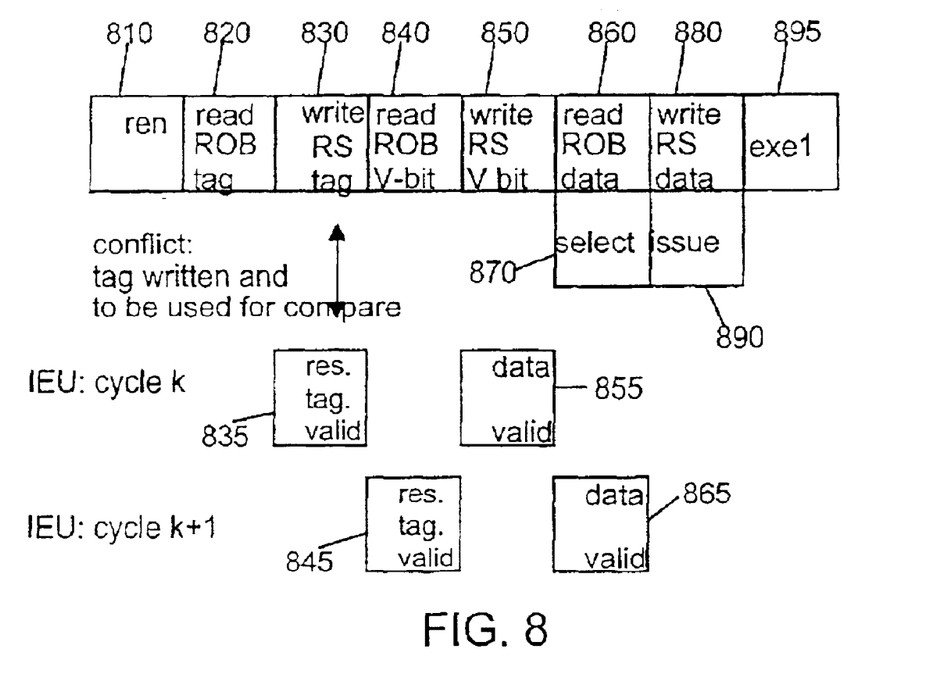
FIG. 8 is a schematic pipeline diagram showing a pipeline without conflicts.

In case this IEU protocol is supported by the ROB and RS, and the pipeline length is adjusted such that write after read conflicts no longer occur then the pipeline shown in FIG. 8 results in having stages 810 to 895. In the bottom part of the figure, the points in time or cycle relationships are given in relation to the pipeline stages in the upper part of the figure.

The event "write RS tag" is depicted with reference sign 830 and in this stage the tag for each source register, as read from the ROB, is written into the RS entry for the instruction. This RS tag can be used for comparison with the result tag from an IEU one cycle later. It should be noted that for the event "result tag valid" as depicted with reference sign 835, in a cycle k the tag will not yet be available for compare (it is written into the RS) and therefore it is not recognized that result data 855 of the IEU that corresponds to the result tag 835 has to be written into the RS source data entry in case of a match between the source tag and the result data tag.

Hence the data 855 will only be written into its ROB entry and not into the source data field of the renamed instruction for which the tag was just written into the RS when the result tag 835 was valid. In this longer pipeline, the occurrence of a write after read conflict is prevented by simply performing the transfer of result data from ROB to the RS after the result data 855 has been written into the ROB. This write is done in stage 850, so when reading the result data in the following stage 860 from the ROB and writing it in 880 into the RS the consistency between the ROB and RS data is preserved and the write after read conflict is prevented at the cost of a much longer pipeline as compared to FIG. 5 in which the write after read conflicts may occur.

The similar situation occurs for the valid bit of the source data. The valid bit for source data in the RS is set when a match between the source tag and result tag is found. During "result tag valid" 835 the RS tag for the source is written and therefor still not set to "undefined" during the compare of the result tag by the RS. Hence, in stage 830 only in the ROB the valid bit will be set based on the "result tag valid" 835.

The setting of the valid bit to ON for the RS source data field is done without conflicts by delaying the read of the valid bit from the ROB 840 ("read ROB V Bit") until the cycle directly after 830, and writing the valid bit into the RS in stage 850. In other words, the consistency between the ROB data and RS data is preserved again at the cost of a longer pipeline. Such a longer pipeline is very costly from a performance perspective.

In particular, the pipeline depicted in FIG. 8 starts with the renaming cycle 810, "ren". In the next cycle 820, however, only the tag 625, see to FIG. 6, is read from the ROB entry and is written in the next cycle 830 into the RS 420 into the tag field 645.

When the IEU returns its data in a cycle k as depicted in FIG. 8, then the tag is just written into the RS. As mentioned before, if, due to the short cycle time, it is not possible to compare the tag after write with the "res tag" 715 of the IEU in the same cycle then the valid bit 730 will not be set for the source operand in the RS since the setting of the valid bit is triggered by the match of the tag of the operand with the tag (s) returned by the IEU(s).

To set the valid bit for the source operand in the reservation station the valid bit is read from the ROB in the next cycle k+1, stage 840, and then written into the RS during stage 850. This setting of the valid bit in the RS could of course also be implemented by adding another tag compare that compares the delayed tag. However this is very costly from a point of area cost.

The matching tag for a source operand in the RS also triggers the write of data and therefore also the data will not be written into the RS for the IEU: cycle k case. Therefore, the pipeline must wait until the data is written into the ROB and then read the data from there in the "read ROB data" and "write ROB data" cycle. So this solution leads to a very long pipeline between the rename of the instruction and the start of the execution in the "exe 1" cycle.

The pipeline could be reduced by doing techniques like snooping in the ROB as well as the RS. This, however, could be done only at the cost of frequency as mentioned before.

SUMMARY OF INVENTION

It is thus an object of the present invention to reduce the pipeline length despite the conflict situations described above.

This object is achieved by the features stated in enclosed independent claims. Further advantageous arrangements and embodiments of the invention are set forth in the respective subclaims.

A primary aspect of the present invention invloves a method for operating an out of order processor which comprises the steps of: processing said pipeline in a compressed way; providing a separate logic for detecting a dependency conflict associated with an instruction currently to be renamed; setting a conflict flag reflecting the detection result; and continuing the processing dependent on the conflict flag.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

The present invention is illustrated by way of example and is not limited by the shape of the figures of the accompanying drawings.

DETAILED DESCRIPTION

The present invention exploits the knowledge that the prior art pipeline processing is sufficiently equipped with logic which assures a correct processing of the instruction stream covering multiple miss predicted branches and multiple dependencies between instructions. In regard of modern pipelines with an increased number of stages as it is the case with prior art high speed out of order processors the inventional key idea is to shorten the pipeline for a considerable number of stages by accepting that a write after read conflict may occur, when directly after renaming, during the "read ROB" pipeline stage, all the information (tag, validity and data) is read from an Reorder Buffer ROB entry, and next is written, in a following pipeline stage "write RS", into a reservation station RS (420) entry. In order to assure the correctness of processing in particular in cases of dependencies, e.g., write after read conflicts a separate inventional add in logic covers these cases. This increases performance because those cases are rather seldom compared to the broad majority of instructions to be found in a statistically determined average instruction flow.

In case of no conflicts occurring the performance can be increased significantly.

In case of conflicts the continuation may be performed differently: For example the first solution is by setting an interrupt bit for the ROB entry in order to tell the commit process to reset the pipeline starting from the instruction with the interrupt bit set. Here, the advantage results that prior art existing chip logic can be used for evaluating said interrupt bit. Or a second solution is by flushing the pipeline as soon as a conflict is detected, thereby starting from the instruction for which the conflict has been found as well as flushing all following younger instructions. The advantage is a faster processing compared to the interrupt setting aspect, where the interrupt is handled by the commit process that processes the instructions in the original program order. This second solution needs, however, a separate logic which informs the fetch unit about the point at which the pipeline is to be reset, i.e., all instructions later than the current instruction must be discarded then. Or, as a solution preferred herein, by providing the reservation station with the missing information which caused the conflict, and continuing to process the same pipeline status without resetting or flushing it. The advantage is that the currently present pipeline status can be saved without discarding any instruction from the pipeline.

A preferred implementation scheme comprises the step of detecting the dependency conflict by reading an instruction tag and a valid bit of a ROB entry, determining that the valid bit was modified without being tracked by the RS, setting the conflict bit for indicating that the entry has to be issued to the RS, issuing the tag to an additional port of the tag compare logic triggering the write of the valid bit into a respective field of the RS.

This scheme can easily be extended to cover pipeline types with or without result/source data storage. Then said result data is simply copied from the respective ROB entry into the respective entry of the RS.

Advantageously, an additional port is provided for the reservation station and the reorder buffer for detecting said conflict and continuing the processing dependent on the conflict flag.

Figure 9:
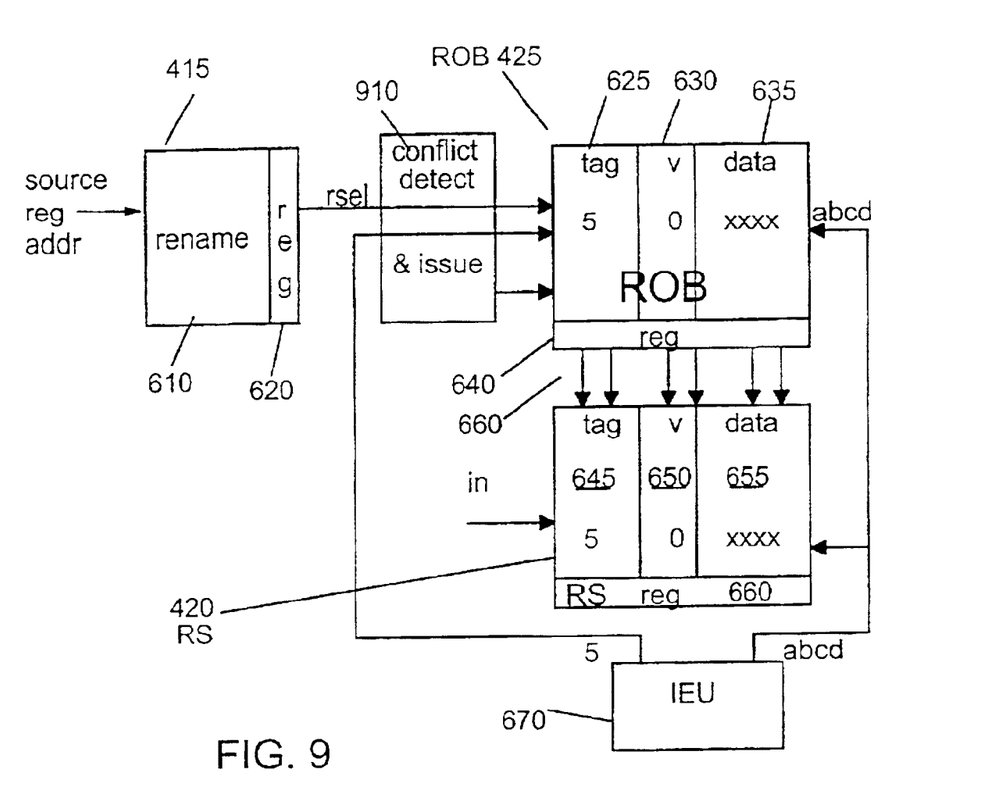
FIG. 9 is a schematic IWB section diagram showing essentials of dependency conflict detection.

With general reference to the figures and with special reference now to FIG. 9 a schematic IWB section diagram is given showing essentials of the inventional dependency conflict detection according to a preferred IWB implementation thereof.

Briefly, an additional logic 910 associated with the ROB 425 is disclosed that detects the case of an IEU writing into the particular entry that is selected by the renaming logic 415 during "read ROB" 520, see back to FIG. 5. Then, a separate issue process selects the entries for which a conflict is reported and writes the data into the respective entry of the RS 420.

FIG. 9 illustrates the solution in more detail. The box "conflict detect & issue" represents the additional logic. It receives the read select (rsel) lines from the renaming logic 415 as well as the result tags from the IEU 670. This enables the conflict detect/issue logic 910 to detect if after reading the tag 625, here having a value of "5", valid bit v 630 and data 635 from the ROB in the "read ROB" cycle the valid bit or data was modified before this could be tracked by the RS, i.e., a conflict situation is present. More details hereto are given below with reference to FIG. 11.

In said conflict situation a conflict bit is set in the ROB 425 entry that the entry has to be copied to the RS after the result of IEU 670 is completely written to ROB 425. If the issue logic in the box 910 "conflict detect and issue" selects the ROB entry, then the tag is read out together with the data and valid bit. The tag 630 is sent to an additional port 660 of the tag compare logic of the RS 420 that triggers the write of the data and valid bit into the RS. In this way, the RS and ROB are made consistent again. The instruction for which the source operand has been written into its RS entry can now be issued for execution when all other operands are valid, too.

Figure 10:
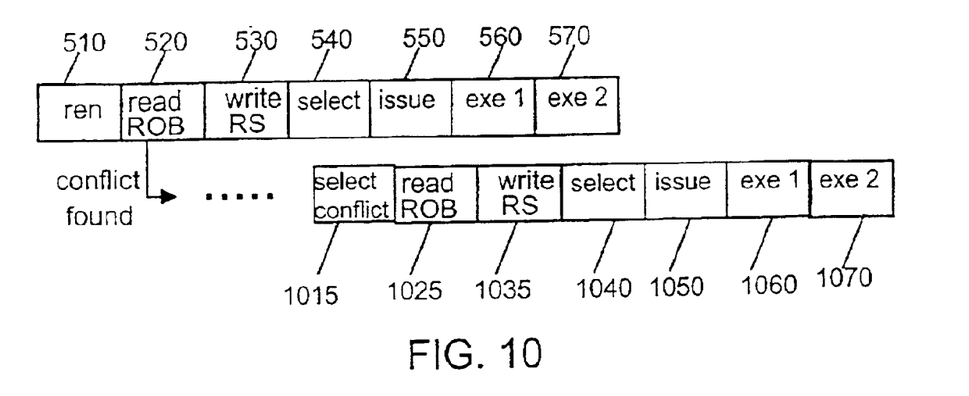
FIG. 10 is a schematic pipeline diagram showing a case with (bottom part) and without (upper part) conflict.

Trace simulations have shown that the cases in which conflicts occur are below 1% in statistically found average. Hence for almost all instructions the pipeline shown in FIG. 5 and the upper part of FIG. 10 is used. Only for the conflict cases a longer pipeline occurs due to the recovery by the "detect conflict and issue" logic as it was described above.

As reveals from FIG. 10, the time when the conflict is resolved depends on the time when the conflict is detected and next selected for issue from ROB to RS. In the earliest case the "select conflict" cycle occurs directly in the cycle after the conflict was detected during the read ROB cycle. Since conflicts happen very seldom, the resulting performance is significantly better compared to when using the pipeline scheme described with reference to FIG. 8.

With additional reference now to FIG. 11, more details of the conflict detect & issue logic 910 are described next below. The rsel(i) line for an entry i in the reorder buffer 425 (referring back to FIG. 9) is ON when the ROB entry has to be read out for a dependent operand. This rsel(i) signal is delayed by the upper latches 1110, . . . 1120 such that the output of the OR gate will be ON for the number of cycles during which a conflict has to be reported in case that the result tag from an IEU addresses the write of data into the entry i. For example, with the two latches 1110 and 1120 shown in FIG. 11, the output of the OR gate 1130 will be ON for three cycles starting at the cycle in which rsel(i) is ON.

In the drawing, the signal flow in the circuit scheme at the upper portion right margin continues in the lower part in the figure. Thus the upper part is a detail representation of block 1140 of the lower part.

By Anding 1165 the OR 1130 output and the wsel(i) signal that comes from the IEU tag decoder 1150 the AND 165 output is ON in case that a conflict is detected. In other words a conflict is detected at least if the read out ROB for entry i and write back results to ROB entry i happen in the same cycle and for the same entry i. Furthermore, a conflict will be reported if the write back results to ROB entry i event occurs if for entry i the output of OR 1130 is ON. The extended conflict detection interval as defined by the OR 1130 output is needed when the IEU supports a protocol in which the result data is valid one or more cycle after the result tag validity. Such an IEU protocol has been discussed in detail before. The AND gate 1190 output being ON sets the latch 1175 to ON and this will remain ON until the entry is selected for issue by the select logic. By the entry being selected the latch 1175 is turned OFF. By the issue(i) being ON the data of entry i is read from the ROB and next written into the RS 420 operand field whereby the conflict is removed as it was sketched out before.

Figure 11:
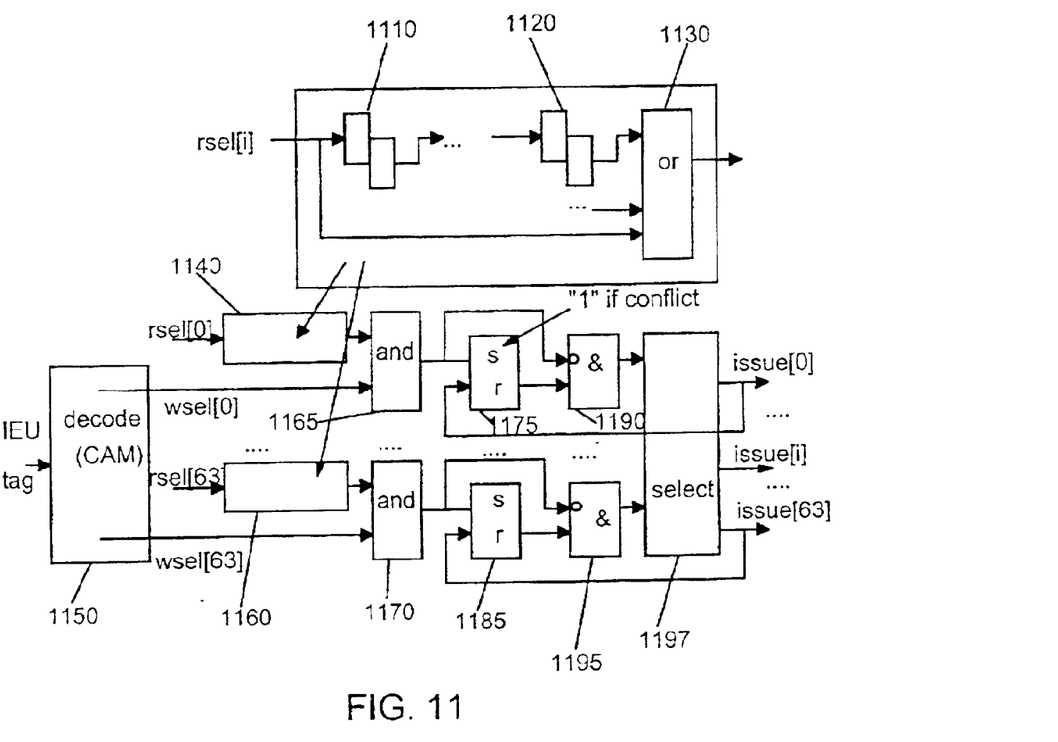
FIG. 11 is a schematic diagram showing essentials an inventional logic circuit embodiment for detecting and issuing a conflict.

The upper branch of FIG. 11 (reference signs 1140,1165, 1175 and 1190) shows the logic structure for the detection of conflicts for Frits entery (i.e. entery 0) of the ROB, White the lower branch (reference signs 1160, 1170, 1185, 1195) shows the logic structure for the detection of conflicts for the lat entery (i.e. entery 63) of the ROB. The logic for all remaining entries 1 . . 62 is not shown, but it is exactly the same as that shown for entry 0 and 63. The select logic 1197 selects the oldest conflict that needs to be resolved and addresses the ROB as described before with reference to FIG. 9.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The decode logic shown in FIG. 11 may also represent a content addressable memory (CAM) when the tag does not address directly the ROB entry. Furthermore, the decode or CAM logic may be also be located into the ROB itself instead of in the "conflict detect and issue" part. Furthermore, the latch is turned OFF for other cases also that are not shown in FIG. 10, like for example when the instruction is purged in case of a miss predicted branch and when the ROB is flushed for example due to an exception.

The solution presented above is especially efficient when several IEUs can write into the RS, each cycle. For example, in the above cited prior art S/390 processor there are 8 IEUs 4 regular and 4 storage ports that write into the IEU. The implementation of the process that copies the data from ROB 425 to RS 420 only requires one additional port for the ROB and the RS. If the number of IEUs is limited another solution can be chosen advantageously that saves the data into a FIFO and re writes the data after the RS station entry has received the tag. For example, if a the RS has only a single IEU, then such a solution would be preferred. In the case of n IEUs, it adds n ports to the RS. Since the area required increases with the square of the number of ports, the FIFO solution becomes unattractive already for a small number of additional ports.

What is claimed is:

1. A method for operating an out of order processor in which a rename process is comprised of a pipeline an instruction stream is processed with, the method comprising the steps of:

processing the pipeline in a compressed way thereby risking dependency conflicts that may arise between instructions processed in program order in said pipeline;

providing a separate logic for detecting a dependency conflict associated with an instruction currently to be renamed;

setting a conflict flag reflecting the detection result; and continuing the processing dependent on the conflict flag.

2. The method according to claim 1 in which the step of continuing the processing comprises the step of setting an interrupt bit in order to reset the pipeline.

3. The method according to claim 1 in which the step of continuing the processing comprises the step of flushing the pipeline.

4. The method according to claim 1 in which the step of continuing the processing comprises the step to provide a reservation station (RS) with the missing information which caused the conflict, and continuing to process the same pipeline status without resetting or flushing it.

5. The method according to claim 4 in which the step of detecting said dependency conflict comprises the steps of;

reading an instruction tag and a valid bit of a ReOrder Buffer (ROB) entry;

determining that said valid bit was modified without being tracked by the RS;

setting said conflict bit for indicating that said entry has to be issued to the RS;

issuing said tag to an additional port of the tag compare logic; and triggering the write of said valid bit into a respective field of said RS.

6. The method according to claim 5 in which the ROB entry comprises result data currently written by an Instruction Execution Unit (IEU), further comprising the step of copying said result data into the respective entry of the RS.

7. A processing system for operating an out of order processor in which a rename process is comprised of a pipeline having an instruction stream being processed, said processing system having means for executing a readable machine language, said readable machine language comprises:

a first computer readable code for processing the pipeline in a compressed way thereby risking dependency conflicts that may arise between instructions processed in program order in said pipeline;

a second computer readable code for providing a separate logic for detecting a dependency conflict associated with an instruction currently to be renamed;

a third computer readable code for setting a conflict flag reflecting the detection result; and a fourth computer readable code for continuing the processing dependent on the conflict flag.

8. The processing system according to claim 7 in which an additional part is provided for a reservation station and a reorder buffer for detecting said conflict and continuing the processing dependent on the conflict flag.

9. A computer system having an out of order processing system, said computer system executes a readable machine language, said readable machine language comprises:

a first computer readable code for processing a pipeline in a compressed way thereby risking dependency conflicts that may arise between instructions processed in program order in said pipeline;

a second computer readable code for providing a separate logic for detecting a dependency conflict associated with an instruction currently to be renamed;

a third computer readable code for setting a conflict flag reflecting the detection result; and fourth computer readable code for continuing the processing dependent on the conflict flag.

* * * * *